(12) United States Patent
Lisenker

(10) Patent No.: US 6,382,369 B1
(45) Date of Patent: May 7, 2002

(54) MAGNETO-RHEOLOGICAL FLUID DAMPER WITH AN EXTERNAL COIL

(75) Inventor: Ilya Lisenker, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/808,333

(22) Filed: Mar. 14, 2001

(51) Int. Cl.[7] .................................................. F16F 9/53
(52) U.S. Cl. ..................................... 188/267.2; 188/267
(58) Field of Search .............................. 188/267, 267.1, 188/267.2

(56) References Cited

U.S. PATENT DOCUMENTS

| | | | |
|---|---|---|---|
| 4,958,704 A | * 9/1990 | Leiber et al. | 188/267 |
| 5,009,450 A | * 4/1991 | Herberg et al. | 280/707 |
| 5,277,281 A | * 1/1994 | Carlson et al. | 188/267 |
| 5,293,969 A | * 3/1994 | Yamaoka et al. | 188/267 |
| 5,632,361 A | * 5/1997 | Wulff et al. | 188/267 |
| 5,678,808 A | 10/1997 | Claude et al. | |
| 5,878,851 A | * 3/1999 | Carlson et al. | 188/269 |
| 5,984,060 A | 11/1999 | Clark et al. | |
| 6,202,806 B1 | * 3/2001 | Sandrin et al. | 188/267.1 |
| 6,260,675 B1 | * 7/2001 | Muhlenkamp | 188/267 |
| 6,318,519 B1 | * 11/2001 | Kruckemeyer et al. | 188/267 |

FOREIGN PATENT DOCUMENTS

WO    WO 98/00653    1/1998

* cited by examiner

Primary Examiner—Christopher P. Schwartz
Assistant Examiner—Devon Kramer
(74) Attorney, Agent, or Firm—Scott A. McBain

(57) ABSTRACT

An MR fluid damper having a damper body tube containing a volume of MR fluid. A piston assembly is disposed in the damper body tube to form a flow gap between an outer surface of the piston and an inner surface of the damper body tube. An external coil surrounds a portion of the damper body tube. The external coil is capable of generating a magnetic field across at least a portion of the flow gap. In another aspect, the piston assembly includes a bearing in contact with the, inner surface of the damper body tube. The bearing maintains the piston assembly concentric within the damper body tube while permitting a flow of the MR fluid through the flow gap.

20 Claims, 2 Drawing Sheets

MAGNETO-RHEOLOGICAL FLUID DAMPER WITH AN EXTERNAL COIL

FIELD OF THE INVENTION

The present invention relates to a magneto-rheological ("MR") fluid damper, and more particularly, to a linearly-acting MR fluid damper suitable for vibration damping in a vehicle suspension system.

BACKGROUND OF THE INVENTION

MR fluids are materials that respond to an applied magnetic field with a change in Theological behavior (i.e., change in formation and material flow characteristics). The flow characteristics of these non-Newtonian MR fluids change several orders of magnitude within milliseconds when subjected to a suitable magnetic field. In particular, magnetic particles noncolloidally suspended in fluid align in chain-like structures parallel to the applied magnetic field, changing the shear stress exerted on adjacent shear surfaces.

Devices such as controllable dampers benefit from the controllable shear stress of MR fluid. For example, linearly-acting MR fluid dampers are used in vehicle suspension systems as vibration dampers. At low levels of vehicle vibration, the MR fluid damper lightly damps the vibration, providing a more comfortable ride, by applying a low magnetic field or no magnetic field at all to the MR fluid. At high levels of vehicle vibration, the amount of damping can be selectively increased by applying a stronger magnetic field. The controllable damper lends itself to integration in vehicle suspension systems that respond to vehicle load, road surface condition, and driver preference by adjusting the suspension performance.

Generally, linearly-acting MR fluid dampers are based on either a monotube or a twin tube cylindrical reservoir design. In the monotube cylindrical reservoir design, a piston moves within the fixed length cylindrical reservoir in response to force from a piston rod that extends outside of the cylinder. In the twin tube cylindrical reservoir approach, an open end of an outer tube slides over an open end of an inner tube to form the twin tube cylindrical reservoir, which has an adjustable length.

Both monotube and twin tube cylindrical reservoirs experience reliability problems arising from the electrical wiring necessary for generating a magnetic field in or around parts of the piston. Typically, the electrical wiring passes up through a passage in the piston rod to a coil in the piston. Elaborate assembly procedures are required to seal this passage. Even if adequately sealed, the electrical wiring flexes with the movement in the piston, sometimes resulting in wire breaks.

In twin tube cylindrical reservoirs, it is known to reduce failure from wire flexing by holding the coil stationary with respect to a portion of the reservoir (e.g., either the inner or outer tube). In particular, in U.S. Pat. No. 5,277,281, a reduced diameter piston moves within a reduced diameter inner tube. A coil, separate from the piston, acts as a valve control for a flow path between the inner and outer tubes, rather than a coil integral to the piston controlling flow past the piston. Although wire flexure is reduced, the reduced piston diameter correspondingly reduces damping. Also, leaks due to introducing wiring into the reservoir are not avoided. In addition, moving parts like check valves wear, reducing the service life of the damper.

Consequently, a significant need exists for an MR fluid damper having a reduced the likelihood of pressure leaks from the MR fluid reservoir, yet does not suffering from reduced performance.

SUMMARY OF THE INVENTION

The present invention provides an MR fluid damper that is of a simpler construction than known dampers and can be manufactured for less cost. However, the MR fluid damper design of the present invention provides an improved, more reliable performance and substantially increases the reliability of the electrical connection to the coil.

According to the principles of the present invention and in accordance with the described embodiment, the present invention provides an MR fluid damper having a damper body tube containing a volume of MR fluid. A piston assembly is disposed in the damper body tube to form a flow gap between an outer surface of the piston and an inner surface of the damper body tube. An external coil surrounds a portion of the damper body tube. The external coil is capable of generating a magnetic field across at least a portion of the flow gap. With the external coil, wires leading to the coil do not have to pass through a fluid seal, nor do they experience flexing or bending during the operation of the MR fluid damper. Therefore, such wires are much less susceptible to breakage.

In another aspect of the invention, an MR fluid damper has a piston assembly disposed in a damper body tube containing a volume of MR fluid. The piston assembly forms a flow gap between the piston assembly and the damper body tube and includes a bearing in contact with the inner surface of the damper body tube. The bearing maintains the piston assembly concentric within the damper body tube while permitting a flow of the MR fluid through the flow gap. The bearing makes the combination of the damper body tube and the piston assembly much more tolerant of side loading, thereby minimizing fluid rheology changes during operation and reducing the wear resistance requirements of those parts.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

For purposes of this description, words such as "upper", "lower", "right", "left" and the like are applied in conjunction with the drawings for purposes of clarity. As is well known, dampers may be oriented in substantially any orientation, so these directional words should not be used to imply any particular absolute directions for a damper consistent with the invention.

Figure 1:
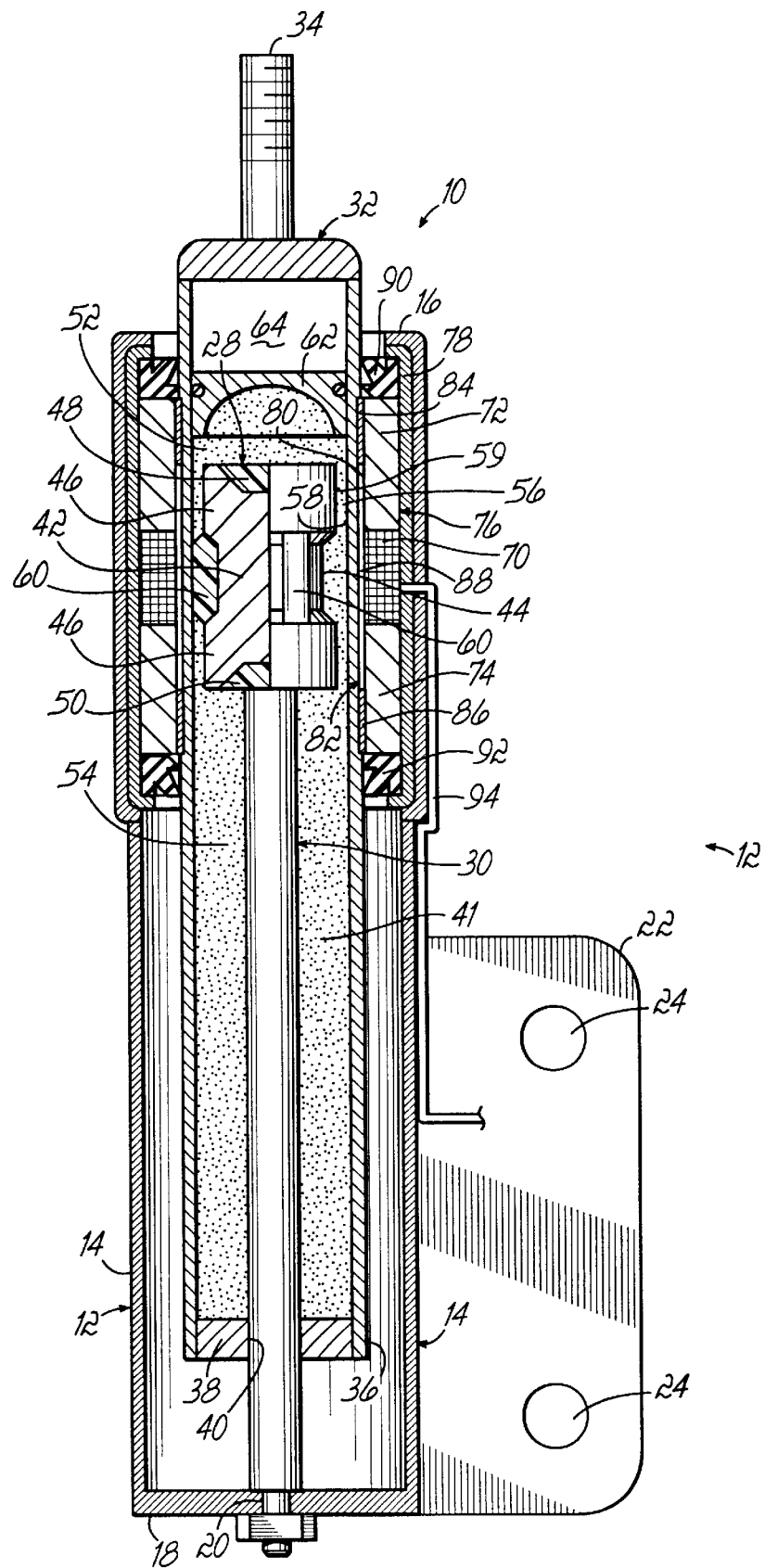
FIG. 1 is a cross-sectional view of a first MR fluid damper in accordance with the principles of the present invention.

Referring to the drawings, illustrated in FIG. 1 is a linearly-acting magneto-rheological (MR) fluid damper, in particular a strut 10. In general, the strut 10 is designed for operation as a load-bearing and shock-absorbing device within a vehicle suspension system, and is connected between the sprung (body) and unsprung (wheel assembly) masses (not shown). The strut 10 comprises a housing 12 that includes a housing tube 14 with an open end 16 and a closed end 18, The closed end 18 includes an opening 20. A mounting bracket 22 near the closed end 18 is secured in position by a suitable means such as welding. The mounting bracket 22 has suitable openings 24 for connection to the unsprung mass of the vehicle at a location such as the steering knuckle (not illustrated).

A piston assembly 28 is connected to a solid piston rod 30 and is fixed in position within the housing tube 14. The piston rod 30 extends through and is attached to the housing 12 at the opening 20. The piston assembly 28 is slidingly received within a damper body tube 32 that includes a first end 34 at an outboard position adapted to be connected to the sprung mass of the vehicle and includes a second end 36 at an inboard position. The second end 36 of the damper body tube 32 is supported about the piston rod 30 by a rod guide 38. An opening 40 in the rod guide 38 allows the damper body tube 32 to move longitudinally inboard and outboard with respect to the housing 12. The damper body tube 32 thus forms a fluid-tight cylindrical reservoir 41.

The piston assembly 28 includes a solid piston core 42 containing ferromagnetic material. The piston core 42 has an annular recess 44 to concentrate a received magnetic field at flux pole pieces 46 at opposed axial ends of the piston core 42. This concentration at the flux pole pieces 46 is enhanced by a top nonmagnetic end member 48 and bottom nonmagnetic end member 50 that limit magnetic flux "lost to the tube". Magnetic field energy that is dissipated through other portions of the damper body tube 32 are referred to as "lost to the tube" since affected MR fluid does not interact with shear surfaces of the piston assembly 28 and damper body tube 32.

The piston assembly 28 divides a volume of magnetorheological (MR) fluid within the damper body tube 32 into a compression chamber 52 and an extension chamber 54. The MR fluid may be any conventional fluid including magnetic particles such as iron or iron alloys which can be controllably suspended within the fluid by controlling a magnetic field, thereby varying the flow characteristics of the MR fluid through shear surfaces of a flow gap 56 defined between a substantially cylindrical, inner surface 58 of the damper body tube and an outer surface 59 of the piston core 42. Varying the magnetic field thereby controls the flow characteristics of the MR fluid to achieve a desired damping effect between the sprung and unsprung masses of the vehicle for a given application.

Fundamentally, during damping, MR fluid present in one of the chambers 52, 54 of the damper body tube 32 flows through flow gap 56 from, for example, extension chamber 54 to compression chamber 52, as the damper body tube 32 moves outboard with respect to the housing 12.

Performance is enhanced by maintaining a constant radial area of the flow gap 56 along the axis of piston assembly 28, that is, maintaining the piston core 42, the damper body tube 32 and the flow gap 56 in concentric alignment. In the strut 10 of FIG. 1, this constant radial area or concentricity is achieved by laterally supporting the piston core 42 within the damper body tube 32 with an interrupted piston bearing 60 disposed in the annular recess 44. The bearing 60 is a non-magnetic material, for example, an austenitic stainless steel, that is attached to the piston core 44 by an adhesive, resistance welding, or other known means. After attaching the bearing 60, the diameter of the piston and bearing assembly is ground in a known manner to achieve a desired size and roundness. The fluid volume displacement of the piston bearing 60 reduces the available shear area in the flow gap 56. However, the undercutting or recess 44 in the piston core 46 maintains a constant flow area along the piston length. The piston core 46 can also be undercut and filled with a nonmagnetic material in order to concentrate the flux at the two ends of the piston, thereby forming two distinct magnetic poles.

A gas cup 62 is also carried in the damper body tube 32 between the piston assembly 28 and the first (outboard) end 34. The gas cup 62 slides along the inner surface 58 of damper body tube 32, separating out a compensation chamber 64 from the compression chamber 52. While the extension chamber 54 and compression chamber 52 carry a supply of MR fluid, the compensation chamber 62 carries a compressible nitrogen gas supply. During extension and compression directed travel of the damper body tube 32 relative to the piston assembly 28, a decreasing or an increasing volume of the piston rod 30 is contained within the damper body tube 32 depending on the stroke position of the strut 10. In order to compensate for this varying volumetric amount of the piston rod 30 within the fluid-filled chambers 52, 54, the gas cup 62 slides, compressing or expanding the compensation chamber 64.

An external coil 70 generates the magnetic field across the flow gap 56 to the flux pole pieces 46 of the piston assembly 28. The external coil encompasses a portion of the damper body tube 32 corresponding to, and stationary with respect to, the piston assembly 28. To concentrate the magnetic field, the external coil 70 is longitudinally placed between a pair of ferromagnetic rings 72, 74, forming an external coil assembly 76.

The external coil assembly 76 is advantageously contained within an external coil crimp casing 78 that provides structural support when the open end 16 of the housing 16 is deformed around the external coil assembly 76 to form an attachment.

An internal surface 80 of the external coil assembly 76 laterally supports the damper body tube 32. In particular, a reservoir guide assembly 82 includes a pair of plain bearings 84, 86 that are pressed into the external coil assembly 76 and bear against the damper body tube 32. The bearings 84, 86 concentrically support the damper body tube 32 with respect to the external coil assembly 76. This provides a fluid-tight chamber 88 between the bearings 84 and 86 which is filled with a lubricating oil. The fluid-tight chamber 88 and bearings 84, 86 are protected by scraper seals 90, 92 on each axial end of the reservoir guide assembly 82 and are in contact with the damper body tube 32. The combination of the bearings 84, 86 and the damper body tube 32 absorb the side loads. The interrupted bearing 60 provides the support for the modest side loads of the piston assembly 28.

An advantage of placing the external coil 70 outside of the cylindrical reservoir 41 is that electrical wiring 94 to the external coil 70 is readily installed through the housing tube 14. In addition, the electrical wiring 94 is secured to the housing 12 so that wire flexure and failure is prevented.

Figure 2:
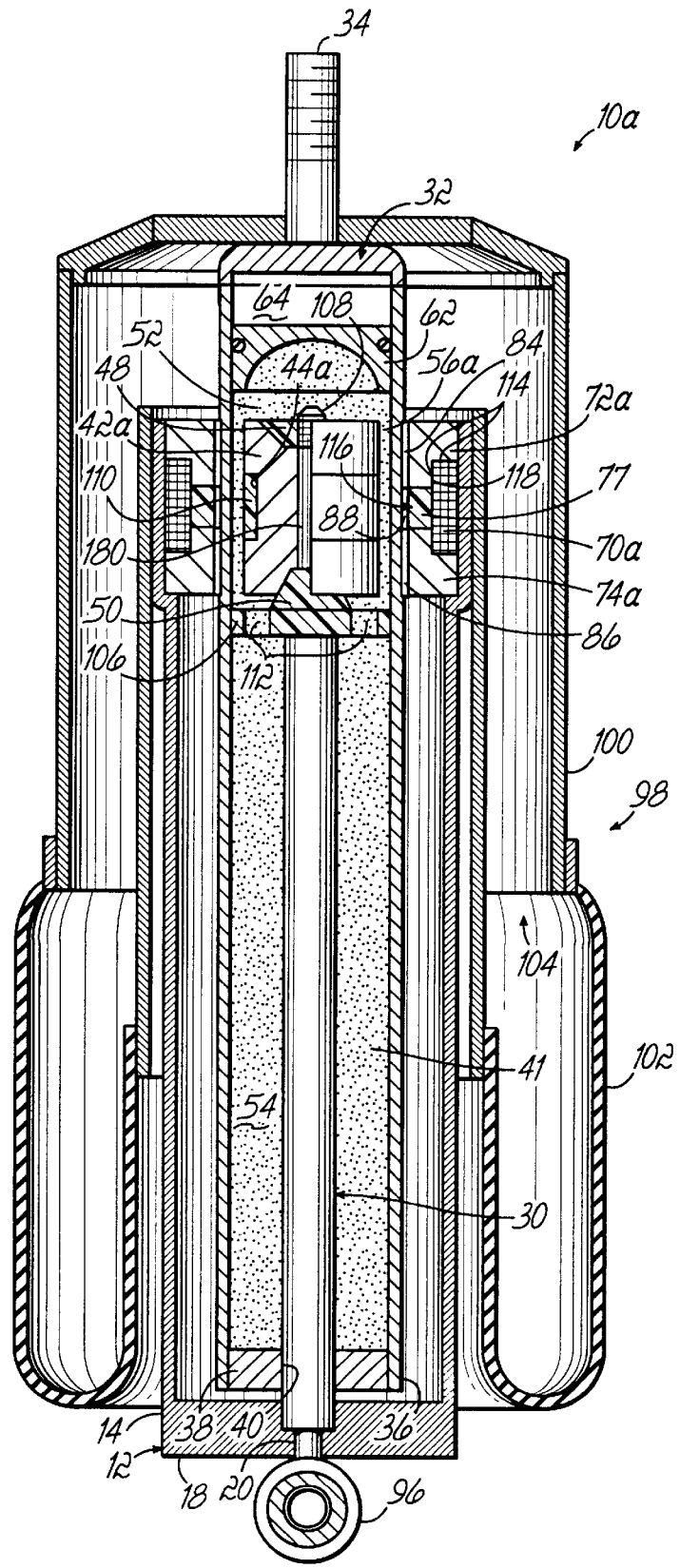
FIG. 2 is a cross-sectional view of a second MR fluid damper in accordance with the principles of the present invention.

Referring to FIG. 2, another strut 10a, consistent with aspects of the invention, is configured for axial attachment at an attachment eye 96. Also, strut 10a includes an airlift bag 98 for biasing the damper body tube 32 in the outboard direction. The airlift bag 98 forms a pressurized vessel that changes in volume as the damper body tube 32 longitudinally translates. In particular, a rigid portion 100 moves with the damper body tube 32. The rigid portion 100 is closed by a flexible portion 102 that is attached to both an opening 104 of the rigid portion 100 and to the housing 12 in a known manner.

Strut 10a depicts an alternative piston lateral support, specifically a bearing plate 106 attached to the bottom end member 50 and the piston rod 30. The piston core 42a is shown partially in cross section to expose a piston central pin 108 which forms threaded connections to the top and bottom nonmagnetic end members 48, 50. As with the bearing 60 of FIG. 1, the combination of the bearings 84, 86 and the bearing plate 106 makes the damper body tube 32 and piston assembly 28 more tolerant of side loads.

Efficient flow of MR fluid through the flow gap 56a is maintained by a nonmagnetic fill member 110 which fills the annular recess 44a and by flow holes 112 in the bearing plate 106.

A shortened external coil assembly 76a is formed with ferromagnetic rings 72a, 74a that each overlap a portion of an inner surface 114 of the external coil 70a, thus allowing the same capacity of magnetic field conductance with a shorter axial length. The shortened external coil assembly 76a further includes a nonmagnetic spacer that connects the ferromagnetic rings 72a, 74a to form a coil bobbin 116. Thus, the external coil 70a is readily formed by wrapping a conductive wire about a coil recess 118 of the bobbin 116.

The shortened external coil assembly 76a allows a shortened piston core 42a with an advantage of increased travel of the strut 10a. However, shear surface along a shortened flow gap 56a is reduced.

By virtue of the foregoing, there is provided an MR fluid damper, or strut 10, with improved resistance to leakage of MR fluid from the cylindrical reservoir, or damper tube body 32, by placing an external coil 70 outside of the reservoir. The external coil 70 also reduces wire flexing and failure known to conventional MR dampers with a coil in the piston assembly.

In use, a linearly-acting MR fluid damper, such as a strut 10, of FIG. 1 can be applied to a vehicle suspension system. The damping action of the strut 10 is changed by applying an electric current to the coil 84 that is representative of the desired damping effect between the sprung and unsprung masses of the vehicle. The electric current creates a magnetic field that sets the flow characteristics of the MR fluid in the flow gap 56, thereby providing the desired damping effect between the sprung and unsprung masses of the vehicle. As the damper body tube 32 moves with respect to the piston assembly 28, the interrupted bearing 60 of FIG. 1 or bearing plate 106 of FIG. 2 maintain the piston assembly 28 in a concentric relationship in the presence of side loads.

Further, with the external coil assembly 76, the wires 94 leading to the coil do not have to pass through a fluid seal; and further, the wires 94 do not experience flexing or bending during the operation of the strut 10. Therefore, the external coil greatly simplifies, and substantially increases the reliability of, the electrical connection design.

In addition, the use of nonmagnetic materials in the respective top and bottom end members 48, 50 and the piston rod 30, reduce flux leakage to the damper body tube 32. The use of nonmagnetic materials in the spacer 77 between ferromagnetic rings 72, 74 and in the recess 44 of the piston core 42, provide a stronger and more concentrated magnetic field.

Thus, the strut 10 of the present invention is a simpler construction that can be manufactured for less cost than prior struts. However, the strut design of the present invention provides an improved, more reliable performance.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, although a monotube cylindrical reservoir is depicted, applications consistent with aspects of the invention may include a twin tube cylindrical reservoir.

The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A magneto-rheological ("MR") fluid damper comprising:
   a damper body tube having an inner surface and containing a volume of MR fluid;
   a piston assembly having an outer surface and disposed in the damper body tube to form a flow gap between the outer surface of the piston and the inner surface of the damper body tube; and
   an external coil surrounding a portion of the damper body tube, the external coil capable of generating a magnetic field across at least a portion of the flow gap.

2. The MR fluid damper of claim 1 further comprising a reservoir guide assembly in longitudinal sliding contact with a the cylindrical reservoir.

3. The MR fluid damper of claim 1 wherein the piston assembly further comprises a bearing in contact with the inner surface of the damper body tube, the bearing maintaining the piston assembly concentrically located within the damper body tube and permitting a flow of the MR fluid through the flow gap.

4. The MR fluid damper of claim 1 wherein the piston comprises a nonmagnetic end member on each end of the piston.

5. The MR fluid damper of claim 4 wherein the piston assembly further comprises a piston rod and a piston core, the nonmagnetic end member coupling the piston core to the piston rod.

6. The MR fluid damper of claim 1 further comprising a pair of ferromagnetic rings, each ferromagnetic ring being located at a different end of the external coil.

7. The MR fluid damper of claim 6 wherein the ferromagnetic rings are extend over an inner directed surface of the external coil and the MR fluid damper further comprises a nonmagnetic spacer disposed between the two ferromagnetic rings along the inner directed surface of the external coil, the pair of ferromagnetic rings and nonmagnetic spacer forming a bobbin about which the external coil is wrapped.

8. The MR fluid damper of claim 6 wherein a piston core has a length substantially equal to a distance between ends of the pair of ferromagnetic rings as separated by a nonmagnetic spacer.

9. The MR fluid damper of claim 6 further comprising a reservoir guide bearing mounted between a portion of the pair of ferromagnetic rings and the damper body tube.

10. The MR fluid damper of claim 6 further comprising an external coil crimp casing containing the external coil and ferromagnetic rings, wherein the damper body tube comprises a deformation attachment about a portion of the external coil crimp casing.

11. The MR fluid damper of claim 1 wherein the piston assembly further comprises a ferrous piston core having an annular recess.

12. The MR fluid damper of claim 11 wherein the piston assembly further comprises a nonmagnetic fill member in at least a portion of the annular recess.

13. The MR fluid damper of claim 1 wherein a nonmagnetic fill member extends between the outer surface of a piston core and the inner surface of the damper body tube, thereby concentrically locating and supporting the piston core within the damper body tube.

14. The MR fluid damper of claim 13 wherein the nonmagnetic fill member is disposed in an annular recess, extends through the flow gap and is in bearing contact with the inner surface of the damper body tube, the nonmagnetic fill member and annular recess being sized to maintain the flow gap at a substantially constant cross-sectional area.

15. The MR fluid damper of claim 1 further comprising a housing for receiving the external coil, the piston assembly and the damper body tube.

16. The MR fluid damper of claim 15 further comprising an airlift bag operatively connected to the damper body tube and to the housing, the airlift bag changing in volume in response to a translation of the damper body tube with respect to the housing.

17. The MR fluid damper of claim 16 wherein the housing holds the piston stationary with respect to the exterior coil.

18. A magneto-rheological ("MR") fluid damper comprising:

a damper body tube having an inner surface and containing a volume of MR fluid; and a piston assembly having
   an outer surface and disposed in the damper body tube to form a flow gap between the outer surface of the piston and the inner surface of the damper body tube; and
   a bearing in contact with the inner surface of the damper body tube, the bearing maintaining the piston assembly concentrically located within the damper body tube and permitting a flow of the MR fluid through the flow gap.

19. The MR fluid damper of claim 18 wherein the piston assembly further comprises:

a bearing plate mounted at one end of the piston assembly, the bearing plate having
   a peripheral surface extending through the flow gap and being in bearing contact with the inner surface of the damper body tube, and
   at least one opening to permit the flow of MR fluid past the bearing plate and through the flow gap.

20. The MR fluid damper of claim 18 further comprising an external coil surrounding a portion of the damper body tube, the external coil capable of generating a magnetic field across at least a portion of the flow gap.

* * * * *